3 Sheets—Sheet 1.

M. W. KIDDER.
PROCESS AND APPARATUS FOR MANUFACTURING ILLUMINATING GAS.

No. 191,766. Patented June 12, 1877.

Witnesses. Inventor.

M. W. KIDDER.
PROCESS AND APPARATUS FOR MANUFACTURING ILLUMINATING GAS.
No. 191,766. Patented June 12, 1877.
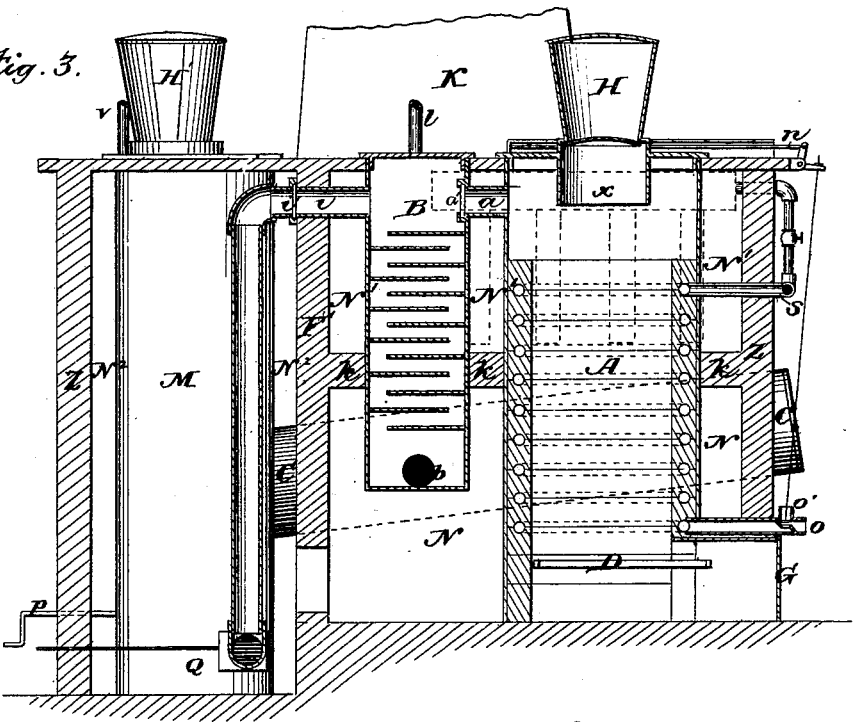
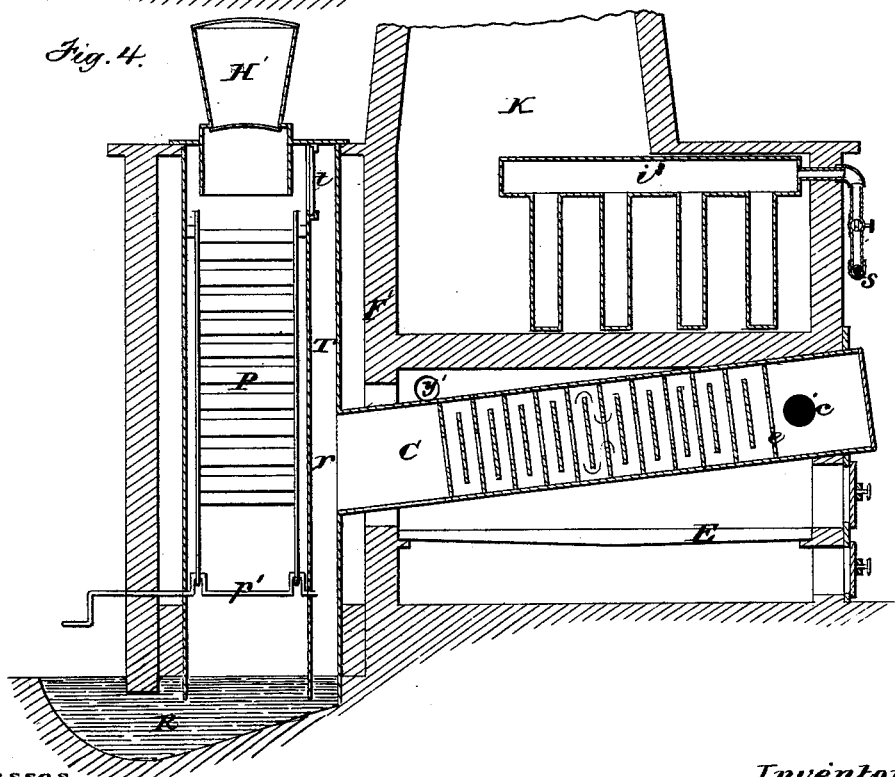

M. W. KIDDER.
PROCESS AND APPARATUS FOR MANUFACTURING ILLUMINATING GAS.

No. 191,766. Patented June 12, 1877.

Witnesses:
P. Noyes
C. F. Brown

Inventor:
Moses W. Kidder

UNITED STATES PATENT OFFICE.

MOSES W. KIDDER, OF BOSTON, MASSACHUSETTS, ASSIGNOR TO HIMSELF AND PERSON NOYES, OF SAME PLACE.

IMPROVEMENT IN PROCESSES AND APPARATUS FOR MANUFACTURING ILLUMINATING-GAS.

Specification forming part of Letters Patent No. 191,766, dated June 12, 1877; application filed May 4, 1876.

*To all whom it may concern:*

Figure 1:
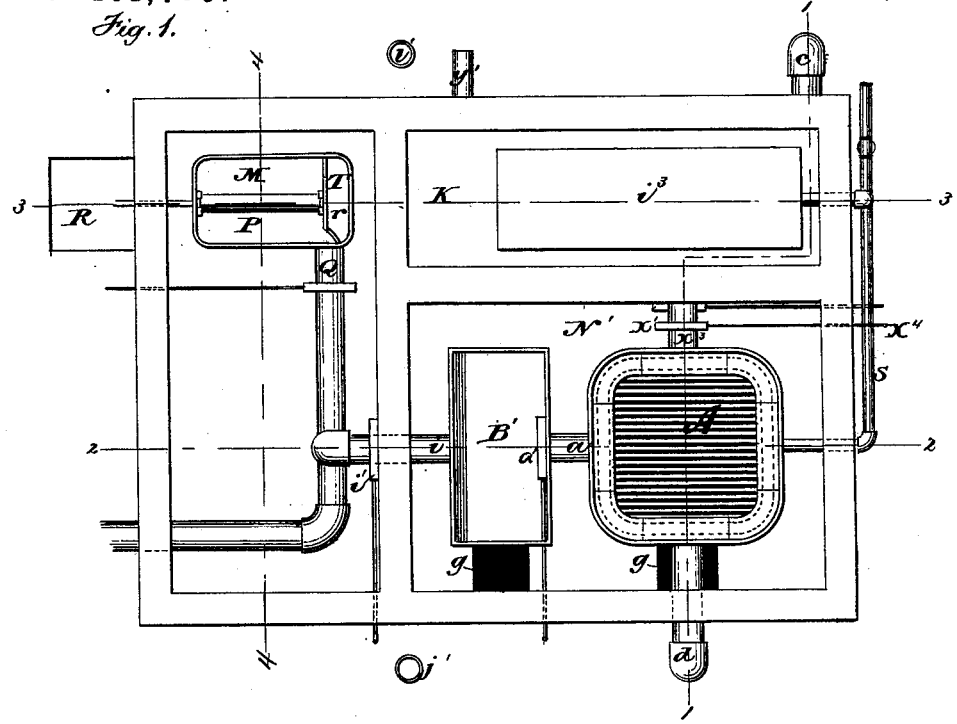
Figure 2:
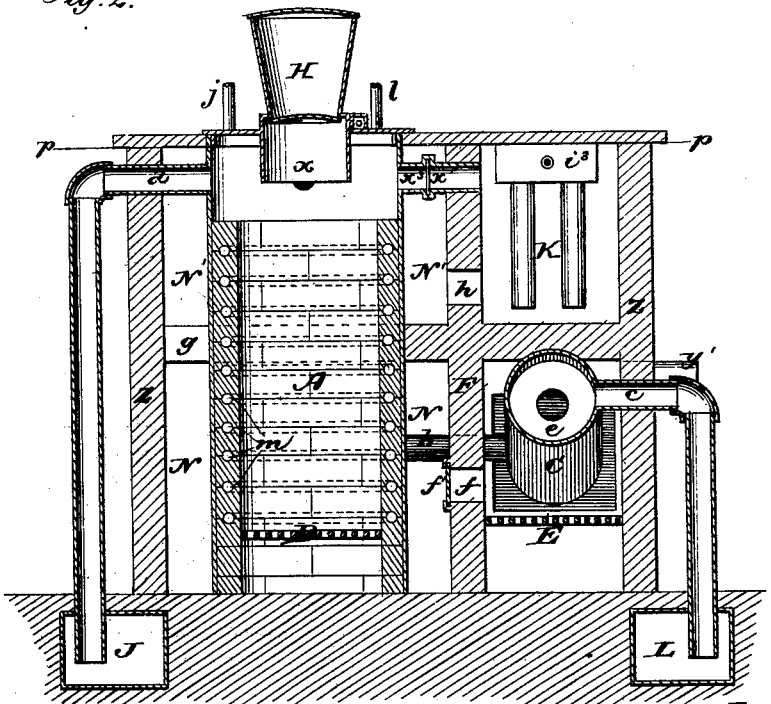
Figure 5:
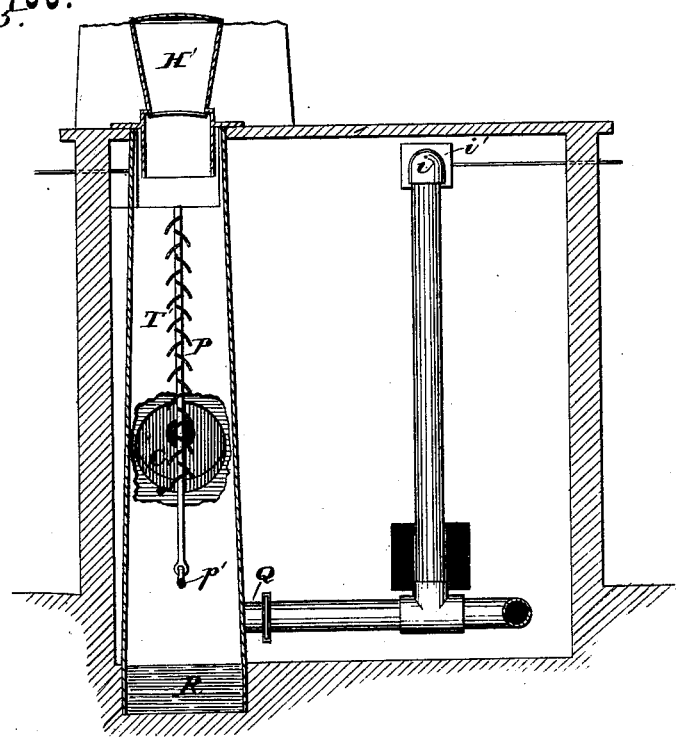
Figure 6:
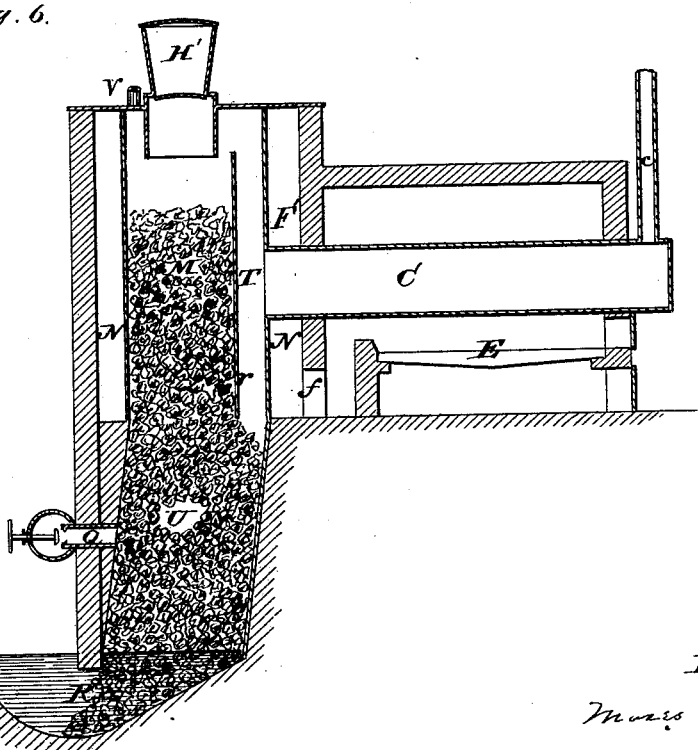

Be it known that I, MOSES W. KIDDER, of Boston, in the county of Suffolk and State of Massachusetts, have invented certain Improvements in Process and Apparatus for the Manufacture of Illuminating-Gas, of which the following is a specification:

In the accompanying drawings, forming a part of this specification, Figure 1 represents a horizontal section of my improved apparatus, taken on the plane of line $p\ p$, Fig. 2. Fig. 2 represents a vertical section on the plane of line 1 1, Fig. 1. Fig. 3 represents a vertical section on the plane of line 2 2, Fig. 1. Fig. 4 represents a vertical section on the plane of line 3 3, Fig. 1. Fig. 5 represents a vertical section on the plane of line 4 4, Fig. 1, a part of the plate $r$ being broken out to show the connection of retort C with trunk T. Fig. 6 represents a vertical section of a modification of the coal-distilling chamber M, with a deep coke-pit, U, constructed with a horizontal retort, C, and the intervening wall F'.

Similar letters of reference in the accompanying drawings refer to like parts.

This invention has for its object to provide an improvement in the process of making illuminating-gas from bituminous coal, and certain improvements in the apparatus employed therefor.

My said process consists, first, in heating bituminous coal in a closed distilling-chamber or retort sufficiently to expel the hydrocarbon vapors from the coal without decomposing said vapors; and, secondly, in introducing combustible non-luminant gases, (such as water-gas, hydrogen, carbonic-oxide or marsh gas) beneath the coal in said chamber, and passing it upwardly through such heated coal, whereby the nascent hydrocarbon vapors are taken up and lifted out from the coal and the non-luminant gases carbureted, the mixed gases and vapors being subsequently superheated, and thus permanently combined.

My improvements in the apparatus for making gas consist, first, in the provision of a movable vapor-escape, to facilitate the passage of the gases and vapors upwardly through the coal in the distilling-chamber, and also to aid in moving the coal or coke in said chamber; and, secondly, in the interposition of a wall between the retort-room and the room containing the distilling-chamber, for the purpose of insuring a much lower temperature in the coal-distilling chamber than in the gas-generating retort, all of which I will now proceed to describe.

The water-gas generator A is constructed with an outer casing of iron and a lining of fire-brick, having grooves and openings $m$ for the passage of steam, an ash-pit, with door G, grate D, hopper H, steam-pipe S, oxygen-pipe O, with its valve O', connected with a thermometric bar, $n$, also a smoke-pipe, $X^3$, with its gate $X^1$, and pipes $a$ and $d$, for the passage of gases from the chamber A.

The vapor-chamber B is connected with the generator A by the pipe $a$, which is provided with a gate for closing the same. In this chamber are numerous plates, B', for the reception and evaporation of refined oil and diversion and mingling of gases and vapors. This chamber is also provided with a pipe, $i$, having a gate, $i^1$, for the admission of water-gas from a holder to the chamber B, also with an outlet-pipe, $b$, connecting it with the retort C, and also with pipes $l$, for admission of refined oil, and $j$, for admission of steam.

The retort C, with its removable diverting-plates $e$, is connected with the vapor-chamber B through the pipe $b$, and at its rear end opens to trunk T, and near its front end a pipe, $c$, is provided, to convey away the gases to and through the hydraulic main L and pipe $l'$, to and through purifiers, &c., to the holder.

The coal-distilling chamber M is constructed of iron, is of greater breadth at its base than at its top, and is provided at the bottom with a coke-pit, U, through which the coke passes to the water-trough R, the water in said trough sealing the coke-pit, so that coke may be removed without breaking the seal, admitting air, or allowing the escape of gas. The plate $r$ with the gate $t$, when closed, divide the distilling-chamber M from the trunk T, which communicates with the retort C at its rear end. The distilling-chamber M is provided with a hopper, H', for introducing coal, a pipe, V, for introducing oil, a pipe, Q, for introducing combustible gases to the coke-pit U, and an agitator, P, which is reciprocated vertically by a crank-shaft, and insures an opening through the coal for the escape of gases and vapors, and also aids in the descent of the coal toward the coke-pit.

Beneath the retort C is a grate, E, for supporting coal for heating the retort and other elements of this group, as described. Beneath the grate E is an ash-pit of ordinary construction.

Around these several parts a substantial wall, Z, of fire-brick, is built, and between the retort-room and the space N $N^1$ $N^2$ are vertical dividing-walls F and transverse vertical wall F', as shown more clearly in Fig. 6, with suitable apertures for the passage of the heated gases and flames from the fire upon the grate E. The space N is divided from the space $N^1$ horizontally by a septum, $k$, which extends over the fire-room, in which is the retort C, separating the fire-room from the chimney K, at the base of which is placed a steam-generator, $i^3$. This horizontal septum has openings $g$, for the passage of smoke, &c., from the space N to $N^1$ on its way to the chimney K through apertures $h$ in the wall F. Covering these several fireways around the apparatus is a top plate.

$y'$ represents a pipe, which is provided for the introduction of gaseous fuel to the fire-room about the retort C.

Having thus fully described the mechanism of my improved gas-generating apparatus, I will now describe its various operations and capabilities.

The operation of my above-described gas apparatus, when used for the production of non-luminant gas as a vehicle for luminant vapors or principles, as contained in bituminous coal, petroleum, &c., is as follows:

I first kindle the fire upon the grate D in the generator A, the ash-pit door G and the gate $X^1$ in the smoke-pipe $X^3$ being open. The fire is now kindled upon the grate E beneath the retort C, the flame from which flows either through apertures $f$ in the wall F to the space N around the generator A, or through the open space around the retort to and about the distilling-chamber M, and reaching the chimney K through the apertures $g$ and $h$. Coal is introduced through the hopper H until the generator is nearly filled, also to supply it as it is burned away. Air is supplied to the burning coal in the chamber A through the ash-pit door G until it is in an active state of combustion; then the gate $X^1$ in the smoke-pipe $X^3$ and the ash-pit door G are both closed, and the admission of air is cut off. Steam is next admitted from the generator $i^3$ through the pipe S to and through the grooves $m$ in the fire-brick lining of the chamber A, where it is effectually superheated, and from thence it is passed into the ash-pit below the grate D, the heat within the generator being maintained in no small measure by the action of the fire upon the grate E as it flows around the generator. The superheated steam from the grooves $m$, on coming in contact with the incandescent coal in the generator, gives its oxygen to the coal to form carbonic oxide, and its hydrogen is set free. No developement of heat results from this, as there is no union of free oxygen with the carbon. These two gases are conveyed either through pipe $d$, hydraulic main J, and pipe $j'$, through purifiers, to the holder for non-luminant gas; or, if it is desired to exchange a portion of the carbonic oxide resulting in the first step of the process for an equal volume of hydrogen, the gate $a'$ in the pipe $a$ is opened, and the gases are passed from generator A through pipe $a$ to chamber B. Steam is also introduced to chamber B through pipe $j$ and mingled with the gases, and passed downward and through pipe $b$ to retort C, where it is exposed to a sufficiently high temperature to convert the carbonic oxide into carbonic acid at the expense of the oxygen of the steam, setting free the hydrogen. From this retort the mixed gases are passed through pipe $c$, hydraulic main L, pipe $l'$, through lime purifiers, which remove the carbonic acid and sulphur compounds, and then the gas is sent to the holder for non-luminant gas. In a little time the temperature of the coal in the generator becomes so far depressed by the heat carried away by the gases generated as to be incapable of decomposing the steam which is admitted through the grooves $m$, and the fire must be aroused by the admission of free or chemically-uncombined oxygen gas. Two ways of doing this are presented. The first is the well-known and practiced method of opening the ash-pit door and carrying the gases resulting away, either to be wasted or to be employed as gaseous fuel, as the large volume of nitrogen from the air renders this gas unfit as a basis for illuminating-gas. A great objection to this method is that the nitrogen of the air admitted constantly carries away half of the heat developed by the oxygen. The other method is to admit to the ash-pit free oxygen gas (not diluted with nitrogen, as in atmospheric air) in such measure as will produce, with the coal in the generator A, sufficient heat, in addition to that received upon the outside, to maintain to its full standard the temperature in the generator. The gases thus produced may be wholly utilized as a basis for illuminating-gas, converting the ton of coal into two and one-third tons of carbonic oxide, and an evolution of hydrogen of equal volume. The latter plan, though involving the necessity and cost of producing oxygen gas, is far more practical and economical than the former.

Being now supplied with water-gas as a base for illuminating-gas, if it is my purpose to render it capable of illumination with liquid hydrocarbons, I close the gate in pipe $a$, and open the gate in the pipe $i$ to admit the non-luminant gas to the vapor-chamber B. Upon the heated plates B' hydrocarbon oil is allowed to fall, and, evaporating, it is mixed with the water-gas, and carried downward and through pipe b to retort C, where it is exposed to a sufficiently high temperature to combine them into a permanent illuminating-gas; or, if preferred, the luminant matter may be obtained from bituminous coal, in doing which I charge the coal-distilling chamber M with bituminous coal through the hopper H', and may, if desired, admit hydrocarbon oil through pipe V upon the coal. The heat from the fire upon the grate E, being turned by closing the gate f', acts upon the outside of this distilling-chamber, and expels and volatilizes the hydrocarbons.

The temperature in the distilling-chamber M is restrained by the wall F', so that the hydrocarbon vapors are not decomposed, but are mingled with the non-luminant gases introduced through pipe Q, and are borne onward through trunk T to retort C, where a higher temperature insures the permanent combination of the vapors and gases as an illuminating-gas.

I now introduce through pipe Q combustible non-luminant gases from the holder to the coke-pit U at the base of the distilling-chamber M, in sufficient volume to form illuminating-gas of the usual standard. This, passing up through the coal, bears along the vapors, and this mixture of vapors and gases then passes downwardly through the heated trunk T to the gas-retort C, where they are permanently combined by the heat therein maintained, from which they are carried through pipe c, hydraulic main L, and pipe l', to and through suitable washers and purifiers to the holder for illuminating-gas.

As the coal is distilled the coke is removed from the trough R without breaking the seal, and fresh coal is introduced through the hopper, so that the production of hydrocarbon vapors may be continuous and uniform. The purpose of the introduction of the non-luminant gas to the coke-pit U is that, in its passage upward through the coal, the hydrocarbon vapors, being distilled therefrom, may be carried at a lower temperature, and as quickly as possible from contact with the coal.

By introducing the water-gas to the coke-pit below the point where the fire acts upon it, the gas is heated and the coke cooled. Thus the gas reaches the distilling coal at an elevated temperature, materially aiding the process of distillation. The effect of such non-luminant gas introduced and passed through the interstices of coal while being distilled at a low temperature is apparent in any form of retort or distilling-chamber.

Air has been passed through coal for the purpose of bearing away the vapors being distilled therefrom, but with great loss. The presence of free oxygen favors the conversion of the hydrocarbon into carbonic oxide and hydrogen, and the gaseous product was of no practical value, except as fuel, as it contained a large proportion of nitrogen from the air.

The valve O' in the pipe O is automatically controlled and regulated by the expansion and contraction of the thermometric bar n through the connecting mechanism, so that, as the temperature of the generator A varies, a greater or less measure of oxygen is admitted inversely to the temperature, whereby any desirable temperature may be uniformly maintained.

By the relative arrangement of the various parts of apparatus I am enabled to accomplish a diversity of purposes with a less expenditure of fuel than might otherwise be required. Gaseous fuel, as made when air is used to arouse the fire in generator A, may be passed through pipe y', to be burned about the retort C.

The effect of the passage of steam through the grooves in the fire-brick lining of the generator A, when in use, is to superheat the steam to a high degree before it reaches the ash-pit.

The object of the movable curved plates P is to insure a free passage of the gas and vapors from the lower part of the distilling-chamber M to the trunk T, also to facilitate the descent of the coal and coke toward the trough R, from which it is readily removed.

The current of non-luminant gas entering the apparatus is controlled in the usual manner by valves of ordinary construction.

I am aware that it has heretofore been proposed to produce gas by passing superheated steam through bituminous coal which is partially incandescent. This process differs widely from mine, inasmuch as I do not allow the coal to reach the point of incandescence, but distil it at a much lower temperature, and pass upwardly through it non-luminant gases, which will mingle with and lift out the hydrocarbon vapors, none of these gases and vapors being decomposed. When this mixture is subsequently superheated the gases and vapors composing it will permanently combine in forming illuminating-gas, without loss of illuminating value.

I do not introduce steam to the distilling coal, as the steam is unavoidably destructive of the illuminating matter of the coal, and a temperature sufficiently high to decompose steam would certainly decompose the hydrocarbons of the coal and destroy their illuminating power. If steam, superheated or otherwise, were passed through coal heated below the point of incandescence, it would still remain steam, and be condensible. It would not be decomposed and converted into gas; and if steam were introduced into distilling coal, (as I introduce non-luminant gases,) mixed with the vapors of the coal, and passed with said vapors into the superheating-retort, the oxygen of the steam would combine with the carbon of the hydrocarbons, resulting in the mutual decomposition of the steam and hydrocarbons, and the production of non-luminant gas only.

I claim as my invention—

1. The process for producing illuminating-gas, which consists, first, in heating bitumi nous coal in a closed chamber or retort sufficiently to expel the hydrocarbon vapors from the coal without decomposing said vapors; and, secondly, in introducing combustible non-luminant gases—such as water-gas, hydrogen, carbonic-oxide or marsh gas—beneath the coal in said chamber, and passing it upwardly through such heated coal, whereby the nascent hydrocarbon vapors are taken up and lifted out from the coal and the non-luminant gases carbureted, the mixed gases and vapors being subsequently superheated, as specified.

2. The movable plates P, in combination with a bituminous-coal-distilling chamber M, for the purposes specified.

3. In combination with the distilling-chamber M and retort C, the interposing wall F', for the purpose specified.

In testimony whereof I have signed my name to this specification in the presence of two subscribing witnesses.

MOSES W. KIDDER.

Witnesses:
C F. BROWN,
PERSON NOYES.